April 8, 1969      V. D. MOLITOR      3,436,979
ENDLESS BELT INSTALLATION INCLUDING BELT TIGHTENING DEVICE
Filed Jan. 23, 1967      Sheet 1 of 2
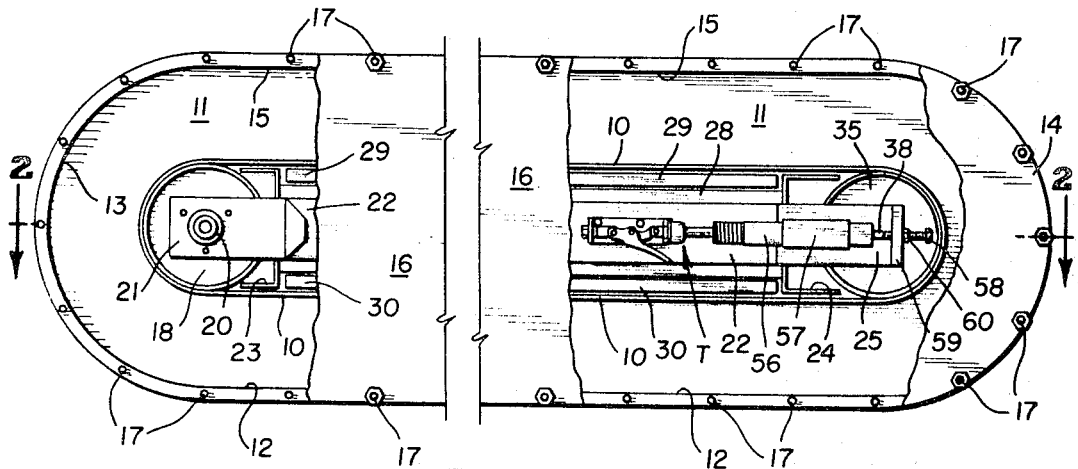
Fig_1
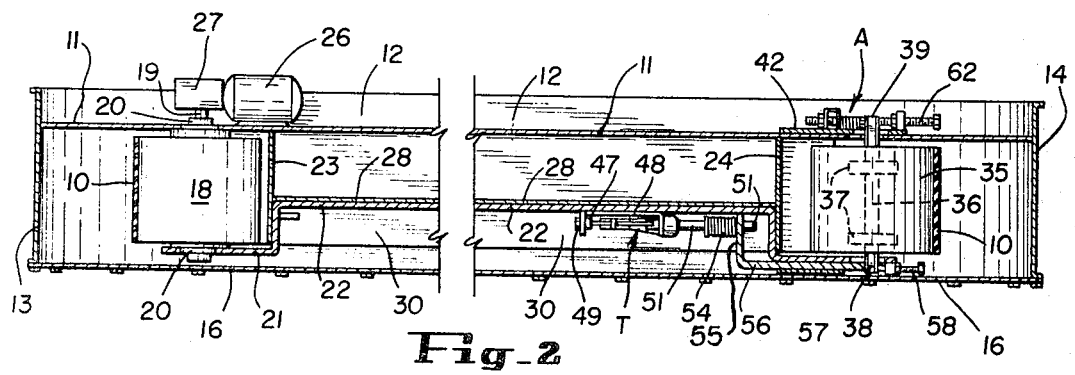
Fig_2
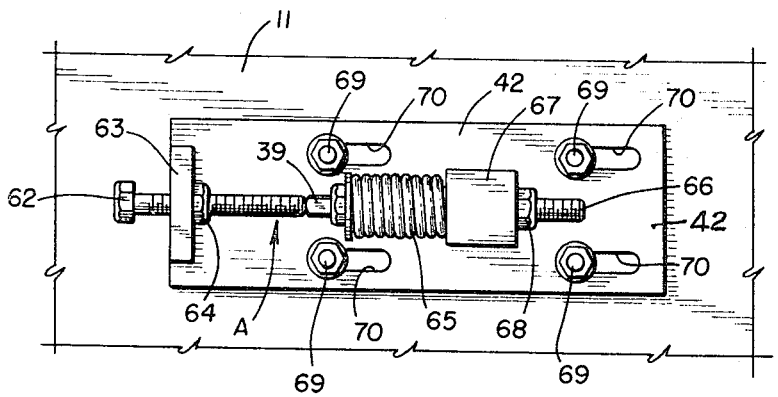
Fig_6
INVENTOR.
VICTOR D. MOLITOR
BY
Van Valkenburgh & Loewe
ATTORNEYS United States Patent Office 3,436,979
Patented Apr. 8, 1969

3,436,979
ENDLESS BELT INSTALLATION INCLUDING
BELT TIGHTENING DEVICE
Victor D. Molitor, 2829 S. Santa Fe Drive,
Englewood, Colo. 80110
Filed Jan. 23, 1967, Ser. No. 610,903
Int. Cl. F16h 7/10
U.S. Cl. 74—242.15                                    6 Claims

ABSTRACT OF THE DISCLOSURE

An endless belt installation in which access to the opposite or back side of the belt is normally inconvenient, including a drive pulley and an idler pulley at opposite ends of the belt. The idler pulley is mounted on a non-rotatable shaft which is tippable, with the idler pulley, on the accessible side and toward the drive pulley. Springs urge each end of the idler pulley shaft toward adjustable stops, while the spring on the accessible side is placed between the upper and lower reaches of the belt, along with a rod surrounding the spring and a toggle device for pushing and retracting a slide bar against the adjacent end of the idler pulley shaft. The toggle device and rod are pivotal about the axis of the rod, so that the toggle handle will clear the belt during movement of the slide bar toward or away from the end of the idler shaft. With the idler pulley and its shaft in tipped position, the corresponding end of the belt may be slipped onto and off the idler pulley without difficulty, with the opposite end of the belt engaging the drive pulley, but the belt will be tightened to the same extent after each removal.

This invention relates to endless belt installations including belt tightening devices, and particularly to endless belt tightening devices which are useful for tightening belts which need to be removed periodically, as for cleaning, when used for conveying food products or the like, and which are installed in such a way that access to one side of the belt only is normally convenient.

Among the objects of this invention are to provide, in an endless belt installation, a novel device for tightening endless belts which will permit the belt to be tightened from a position at one side only of the belt; to provide such a belt tightener which will permit the belt to be readily removed from one side, as for cleaning or similar purposes; to provide such a belt tightener which permits adjustment of the pulley around which the belt passes at one end of belt travel, without undue difficulty; to provide such a belt tightener which, upon release, permits the easy removal of the belt; to provide such a belt tightener which permits the belt to be readily replaced from one side, such as following cleaning or the like; to provide such a belt tightener which causes substantially the same pressure to be exerted against the belt, both on initial installation and upon each reinstallation; to provide such a belt tightener which may be readily constructed and installed; and to provide such a belt tightener which will operate in an efficient and effective manner.

Additional objects and the novel features of this invention will become apparent from the description which follows, taken in conjunction with the accompanying drawings, in which:

FIG. 1 is a condensed side elevation of a belt installation including a belt tightener constructed in accordance with this invention, with the belt in tightened condition and a housing broken away to show parts otherwise hidden from view;

FIG. 2 is a condensed, horizontal, longitudinal section, taken along line 2—2 of FIG. 1;

FIG. 6 is a horizontal section, taken along line 6—6 of FIG. 4.

Figure 3:
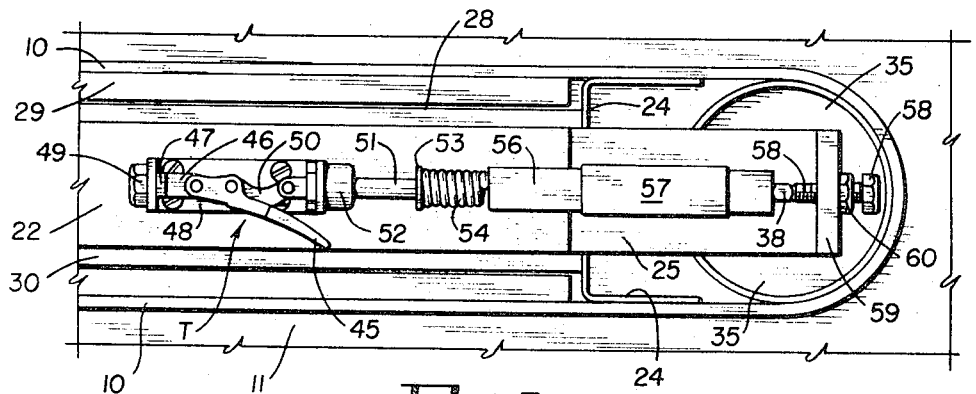
FIG. 3 is a fragmentary side elevation consisting essentially of a portion of FIG. 1, but on an enlarged scale, showing one end of the belt and a portion adjacent thereto on the side from which the belt is removed, together with the parts of the belt tightening device of this invention located on that side.

The belt tightening device of this invention is shown in the drawings as applied to an endless belt 10 which is adapted to move material, such as food, from one end of an elongated, enclosed housing to the opposite end thereof, the housing being provided with suitable inlet and outlet openings (not shown), with the inlet usually above one end of the belt and the outlet usually below the opposite end. Also, several inlets may be provided in the top and/or several outlets in the bottom of the housing, if desired. The housing, as in FIGS. 1 and 2, includes an upright rear wall 11, the peripheral edge of which may be welded or attached in any other suitable manner to a bottom wall 12, to semicircular end walls 13 and 14, and to a top wall 15. A front plate 16 is removably attached, as by nuts engaging studs 17 extending laterally from a peripheral flange, as shown, of the top, bottom and end walls, for access to the interior of the housing, so that the parts therein may be thoroughly cleansed, and the belt 10 may also be removed for cleaning. One end of the belt is driven by a closed, drum type pulley 18 mounted on a shaft 19, which is journaled in a pair of bearings 20, respectively mounted on the rear wall 11 and an angular bracket 21, which may be attached to or formed integrally with a central, upstanding rib 22. Bracket 21 and rib 22 are supported by a laterally disposed channel 23 at one end of rib 22 and a corresponding channel 24 at the opposite end of the rib, with channel 23 reinforcing the transverse leg of bracket 21 and channel 24 reinforcing the transverse leg of a similar angular bracket 25, again attached to or formed integrally with central rib 22. The inner edges of channels 23 and 24 are attached, as by welding, to the rear wall 11 and to rib 22 and brackets 21 and 25. Shaft 19 is rotated by a motor 26, conveniently mounted on the back side of the rear wall 11 and connected to a speed reducer 27, in turn connected to shaft 19. As will be evident, pulley 18 is mounted on a fixed axis. Rib 22 is reinforced by an upright flange 28, extending between channels 23 and 24, and also upwardly above rib 22 and downwardly below the rib, to support longitudinally extending guides 29 and 30 for the upper and lower reaches of the belt, respectively. The upper and lower flanges of channels 23 and 24 also act as guides for the belt, adjacent the respective pulley.

In accordance with this invention, a pulley 35 for the opposite end of the belt is again a closed, drum type pulley, but is not driven, being freely rotatable about a shaft 36 and provided on the inside with a pair of bearings 37, as in FIG. 2. Shaft 36 is adjustable, to permit the desired amount of tension to be produced on the belt, but is also adapted to be tipped, so that pulley 35 will be inclined, as to the position of FIGS. 4 and 5, to permit the belt to be readily slipped onto and off the pulley.

In further accordance with this invention, one end of the shaft 36 is moved rearwardly and forwardly, with respect to the centerline of the belt 10, by a toggle device T, with the other end of the shaft 36 being pivotal in an adjustment device A mounted on the rear side of rear wall 11. Ends 38 and 39 of the shaft 37 are each provided with a flat on opposite sides, so that shaft 36 will be restrained from turning, as by a slot 40 in bracket 25 and a slot 41 in a supporting plate 42 for the adjustment device A, as in FIGS. 5 and 6. End 39 of the shaft also extends through a slot 43 in rear wall 11.

Figure 4:
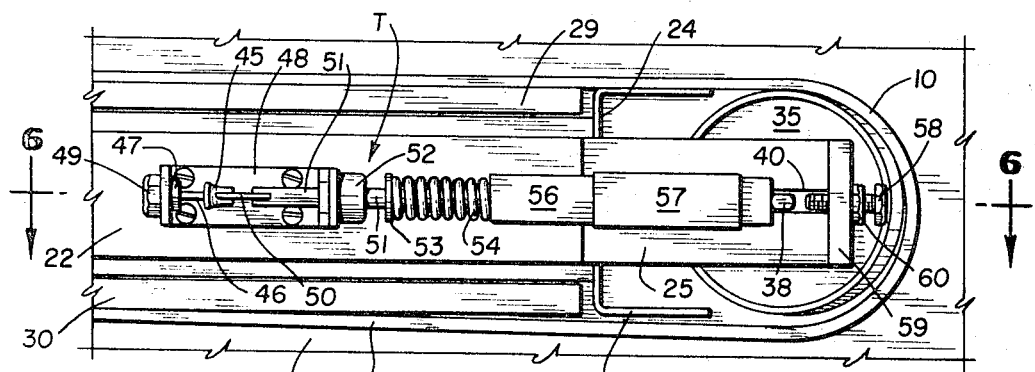
FIG. 4 is a fragmenary side elevation, similar to FIG. 3, but showing the belt tightener released for removal of the belt.

The toggle device T, as in FIGS. 3 and 4, includes a lever 45 which is pivotally mounted at its inner end on a pivotal base 46 having a head 47 engaging the inside of one flange of a channel shaped bracket 48, the end of base 46 opposite lever 45 being threaded to receive a nut 49, for attachment to the bracket. At a generally central position, lever 45 is pivotally connected to a link 50 which, in turn, is pivotally connected to a rod 51 movable through and pivotal in a short guide sleeve 52 mounted on the opposite flange of channel bracket 48. Rod 51 is provided with a stop disc 53 engaging one end of a coil spring 54, while the rod also extends through the spring, to prevent the spring from buckling or binding, and further through a hole in a flange 55 of a slide bar 56, against which the opposite end of spring 54 abuts, as in FIG. 5. Slide bar 56 is movable forwardly and rearwardly within a rectangular guide sleeve 57 mounted, as by welding, on the outer leg of bracket 25. The end of slide bar 56 engages the end 38 of shaft 36, to move the shaft against an adjustable stop bolt 58, as in FIGS. 1–3, or to permit the inner end of the shaft to be tipped by the pressure of belt 10, as in FIGS. 4 and 6. Stop bolt 58 is threadedly mounted in a bar 59 attached, as by welding, to the end of bracket 25 and is provided with a lock nut 60 for securing the stop bolt 58 in any desired adjusted position.

Figure 5:
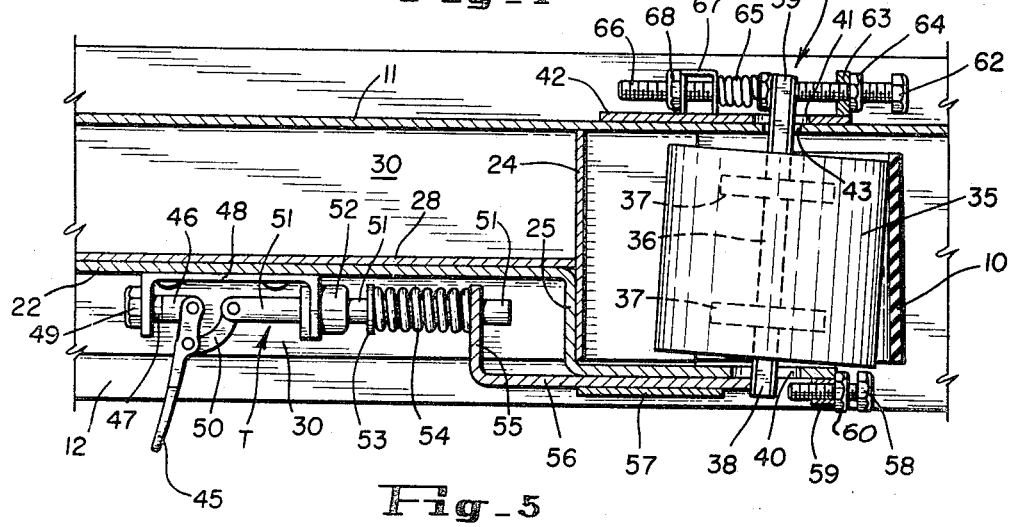
FIG. 5 is a fragmentary side elevation, on the same scale as FIG. 3, but showing the parts of the belt tightener located on the opposite side of a wall, as of a housing, which prevents the belt from being removed from that side.

On the rear side of wall 11, as in FIGS. 5 and 6, the end 39 of shaft 36 is adjusted by adjustment device A, primarily by a stop bolt 62 which threadedly engages a bar 63 mounted on plate 42 and is provided with a lock nut 64. Shaft end 39 is held against the end of stop bolt 62 by a coil spring 65 which surrounds a bolt 66, mounted in a channel shaped bracket 67 attached to mounting plate 42 and provided on the opposite side of bracket 67 with an adjustment nut 68, which limits the distance bolt 66 may move against shaft end 39. An additional adjustment is provided by a series of studs 69 attached, as by welding, to the rear side of rear wall 11 and extending through slots 70 in plate 42, so that nuts, as shown, may be tightened on studs 69 to clamp plate 42 against the rear wall. Slots 70 permit the compression of spring 65 to be adjusted, with a corresponding adjustment bolt 62, without changing the centerline of shaft 36.

As will be evident, when lever 45 of toggle device T is thrown forwardly, as in FIGS. 1–3, end 38 of shaft 36 will be pushed against stop bolt 58 and the desired tension on the belt produced by coil spring 54. Of course, the stop bolts 58 and 62 should be adjusted, so that shaft 36 is perpendicular to the path of travel of the belt, and the belt will track correctly on the pulleys. In the locked position of FIGS. 1–3, the lever 45 is moved downwardly, so as to be out of the way. When the belt 10 is to be removed, as for cleaning purposes, the front plate 16 is removed and lever 45 pivoted upwardly to a horizontal position, as in FIGS. 4 and 6, then moved outwardly to relieve the pressure of coil spring 54 against slide bar 56 and permit the belt tension to tip pulley 35 and shaft 36 to the position of FIGS. 4 and 6, toward pulley 18. As will be evident, shaft end 39 tips about the fulcrum formed between the head of bolt 66 and stop bolt 62, with a slight compression of spring 65, so that the pulley 35 is tipped sufficiently to permit the belt to be readily removed therefrom. Of course, as the belt 10 is slipped off pulley 35, the reduced pressure of spring 54 will cause the slide bar 56 to move the outer end of shaft 37 toward stop bolt 58, but the reduced pressure of coil spring 54 is insufficient to impede the operation of removing the belt 10 from pulley 35. After the belt 10 has been removed from pulley 35, it may then be slipped off the drive pulley 17 and then removed from the housing, as for cleaning or replacement purposes. While the belt 10 is removed, the inside of housing H, as well as parts therein, may be cleaned and sterilized, as by steam, when food is being handled by the belt 10.

For reinstallation of belt 10, it is necessary only to slip one end over drive pulley 17, guide the upper and lower reaches of the belt along the guides 29 and 30, then start to push the opposite end onto pulley 35. A slight pressure by the belt will move shaft 36 and slide bar 56 to the position of FIGS. 4 and 6, while the inclination of the pulley assists in pushing the belt onto pulley 35. As soon as the belt reaches the position of FIG. 6, the lever 45 may be moved inwardly, to tighten the belt, and then shifted downwardly to the position of FIG. 3.

When food is being handled, both housing H and the parts inside are preferably made of stainless steel, except for the coil spring 54, which may be made of any suitable spring steel compatible with food handling or processing. It will be noted that, for initial installation and adjustment of the position of end 39 of shaft 36, access to the rear side of the housing is necessary. However, after that time, the belt may be removed and replaced a great number of times, normally without the necessity of adjusting any part of adjustment device A on the rear side of the housing.

As will be evident, the belt tightening device of this invention fulfills to a marked degree the requirements and objects hereinbefore set forth. Thus, the toggle device T permits the belt to be readily removed, as for cleaning, from a position at one side only, as well as to be replaced and tightened from the same side. Although illustrated as operating in a housing, it will be understood that the tightening device of this invention may be utilized with advantage in other types of installations, such as beneath counters, along walls or the like, in transportable equipment and others, particularly food service equipment where the belt should be removed and cleaned periodically. Other types of installations in which the tightening device may be used to advantage will also suggest themselves.

Although a preferred embodiment of this invention has been illustrated and described, it will be understood that other embodiments may exist and that various changes and variations will suggest themselves to those skilled in the art, without departing from the spirit and scope of this invention.

What is claimed is:

1. An endless belt drive mounted upon and outstanding from a wall structure and comprising, in combination therewith:
    a drive shaft extending through the wall and having a drive pulley outstanding from the wall at a first location;
    an adjustable idler shaft extending through the wall and having an idler pulley outstanding from the wall at a second location;
    a belt extended between and around the pulleys;
    first supporting means for supporting the end of said idler shaft at the side of said wall remote from said idler pulley, said first supporting means permitting said opposite end of said idler shaft to be tipped; and
    second supporting means for supporting said opposite end of said idler shaft and including means for adjusting said idler shaft to normally hold the belt tightly between the pulleys and alongside said wall, but to tip the opposite end of said idler shaft towards said drive shaft, to permit removal of the belt from the pulleys by moving said belt in a direction away from said wall.

2. An endless belt drive, as defined in claim 1, wherein said second supporting means includes:
    resilient means urging said idler pulley against said belt; and adjustable means for limiting movement of said idler pulley away from said drive pulley.

3. An endless belt drive, as defined in claim 2, wherein said second supporting means includes a toggle device.

4. An endless belt drive, as defined in claim 3, wherein:
said toggle device is mounted between the upper and lower reaches of said belt;
a slide bar engages said opposite end of said shaft and is provided with a flange extending between the upper and lower reaches of said belt; and
a spring bears between said flange and said toggle device, whereby said slide bar is movably urged by said toggle device to urge said opposite end of said idler shaft away from said drive pulley and said slide bar is retractable by said toggle device to cause said opposite end of said shaft to tip toward said drive pulley.

5. An endless belt drive, as defined in claim 1, wherein said second supporting means includes:
an angular bracket extending from said wall between the upper and lower reaches of said idler pulley and alongside said idler pulley, said bracket having a slot in which said opposite end of said idler shaft is movable toward and away from said drive pulley, said opposite end of said idler shaft having opposed flat sides to prevent rotation through engagement with the opposed edges of said slot;
an adjustable stop mounted on the end of said angular bracket for engagement with said opposite end of said idler shaft on the side thereof opposite said drive pulley;
a guide mounted on said bracket opposite said stop;
a slide bar movable in said guide into engagement with said opposite end of said idler shaft, said slide bar having an inwardly extending flange provided with a hole;
a rod movable in said hole and having a disc mounted thereon spaced from said slide bar flange;
a coil spring surrounding said rod and bearing between said disc and said slide bar flange;
a guide sleeve for supporting said rod at a position spaced from said spring;
a handle pivotally connected to a support pivotal about an axis in substantial alignment with said rod; and
a link pivotally connected between the end of said rod opposite said flange and an intermediate point on said handle.

6. An endless belt drive, as defined in claim 1, wherein said first supporting means includes:
a plate mounted on said wall and having a slot through which said end of said idler shaft extends, said end of said idler shaft having opposed flats which prevent said shaft from turning by engagement with the edges of said slot;
an adjustable stop mounted on said plate for engaging the side of said opposite end of said shaft remote from said drive pulley;
an elongated member having a head engaging said opposite end of said shaft opposite said stop;
a bracket supporting said headed member for longitudinal movement;
adjustable means associated with said bracket and said headed member for limiting movement of said headed member away from said drive pulley; and
a coil spring surrounding said headed member and bearing between said bracket and said head.

References Cited

UNITED STATES PATENTS

| | | | |
|---|---|---|---|
| 493,726 | 3/1893 | Ivey | 74—242.14 |
| 665,820 | 1/1901 | Willings | 74—227 |
| 734,643 | 7/1903 | Whitney | 74—242.15 XR |
| 1,006,529 | 10/1911 | Brown | 74—242.15 |
| 2,413,265 | 12/1948 | Thompson | 74—242.14 XR |
| 2,626,639 | 1/1953 | Hess | 74—242.15 XR |
| 2,626,671 | 1/1953 | Hardy et al. | 74—242.15 XR |

FOREIGN PATENTS 1,123,531  2/1962  Germany.

MILTON KAUFMAN, *Primary Examiner.*

JAMES A. WONG, *Assistant Examiner.*